United States Patent
Jha et al.

(10) Patent No.: US 7,494,631 B2
(45) Date of Patent: Feb. 24, 2009

(54) TITANIFEROUS ORE BENEFICIATION

(75) Inventors: Animesh Jha, Leeds (GB); Ephraim Jeya Kumari, Thuckalay (IN); Abhishek Lahiri, Malleswaram Bangalore (IN)

(73) Assignee: Millennium Inorganic Chemicals, Hunts Valley, MD (US)

( * ) Notice: Subject to any disclaimer, the term of this patent is extended or adjusted under 35 U.S.C. 154(b) by 163 days.

(21) Appl. No.: 11/728,446

(22) Filed: Mar. 26, 2007

(65) Prior Publication Data

US 2008/0241026 A1 Oct. 2, 2008

(51) Int. Cl.
*C01G 3/00* (2006.01)

(52) U.S. Cl. .............................. 423/81; 423/82; 423/84

(58) Field of Classification Search .................... 423/81, 423/82, 84
See application file for complete search history.

(56) References Cited

U.S. PATENT DOCUMENTS

| | | | |
|---|---|---|---|
| 1,911,396 A * | 5/1933 | Saklatwalla et al. ........... 423/71 |
| 3,069,235 A * | 12/1962 | Schechter et al. ............. 423/84 |
| 3,857,781 A | 12/1974 | Maynard |
| 4,038,363 A * | 7/1977 | Jarish .......................... 423/82 |
| 4,097,574 A | 6/1978 | Auger et al. |
| 4,986,969 A | 1/1991 | Tanihara |
| 6,346,223 B2 | 2/2002 | De Matos et al. ............. 423/84 |
| 6,531,110 B1 | 3/2003 | Borowiec et al. |
| 2003/0143456 A1 | 7/2003 | Kazacos et al. |
| 2005/0142051 A1 | 6/2005 | Lakshmanan |
| 2007/0012630 A1 | 1/2007 | Wright et al. |

FOREIGN PATENT DOCUMENTS

WO 02/10068 * 2/2002

OTHER PUBLICATIONS

El-Tawil, et al., "Aklali Reductive Roasting of Ilmenite Ore", *Canadian Metallurgical Quarterly*, 1996, 35(1), 31-37.

* cited by examiner

*Primary Examiner*—Steven Bos
(74) *Attorney, Agent, or Firm*—Dunlap Codding P.C.

(57) ABSTRACT

This invention relates to a process for beneficiating a titaniferous ore. The process comprises calcining the titaniferous ore, at least one alkali or alkaline earth metal salt, and at least one alumina-containing material in the presence of oxygen to form a calcined ore mixture, then leaching the calcined ore mixture with a solution comprising ammonium, sodium or magnesium chloride in the presence of oxygen to form a leached ore mixture, and contacting the leached ore with an acid to form a beneficiated ore.

18 Claims, No Drawings

TITANIFEROUS ORE BENEFICIATION

FIELD OF THE INVENTION

This invention relates to a process for beneficiating a titaniferous ore.

BACKGROUND OF THE INVENTION

Titanium dioxide ($TiO_2$) is commercially produced by either the sulfate process or the chloride process. In the chloride process, titania-containing feedstocks are chlorinated to form titanium tetrachloride which is then oxidized to form $TiO_2$. This process operates most efficiently starting from titania-containing feedstocks having high $TiO_2$ content. Due to steady growth in the $TiO_2$ markets, existing supplies of titania-containing feedstocks, such as ilmenite and natural rutiles, are coming under pressure. The new beach sand/placer deposits are of variable quality and many are unsuitable for upgrading and beneficiation using existing commercial processes.

Various titaniferous ores have high concentrations of zircon and monazite minerals due to their geological proximity. The zircon and monazite impurities in the feedstock reduce its market value. Actinide and lanthanide impurities create operational problems (e.g., high chlorine consumption or sticky beds) and generate hazardous waste with high concentrations of actinides, lanthanides and other heavy metals. Due to stringent environmental regulations in many countries, the treatment and disposal of such hazardous waste from chloride and sulfate process plants has resulted in increased cost of waste treatment and management.

Many different beneficiation methods for improving the $TiO_2$ content of titaniferous ores have been developed. Conventional processes include physical processes such as gravitational, magnetic and electrical separation which are used to separate the magnetite, monazite, zircon and other siliceous gangue. Other conventional processes are chemical processes, such acid leaching and $TiO_2$-slag formation (high temperature reduction), such as the Becher process, which are mainly used to remove iron.

Unfortunately, these conventional processes require high quality ilmenite ores. The ores containing monazite, zircon and actinides are not reduced even at high temperatures because of the bound heavy metals as phosphates. The level of critical impurities such as $Cr_2O_3$, $V_2O_5$, $Nb_2O_5$ (which degrade pigment properties) and CaO, $Al_2O_3$ and $SiO_2$ (which create operational problems such as sticky beds) remains very high in the end product. Also, solute impurities (Fe, Nb, U, Th, Ce) in the $TiO_2$ phases (pseudorutile, ilmenite, anatase) remain in the feedstock and end up in the waste stream of the pigment-grade $TiO_2$ manufacturing process (chlorination or sulphatation).

The slagging process (which is the main source of feedstock for pigment-grade $TiO_2$ manufacturing) separates only iron oxides and most of the other impurities remain in the feedstock. The slagging process also faces uncertainty due to its high power consumption and emission of greenhouse gases during electric arc smelting.

In view of the changing sources (deposits) of $TiO_2$ ores and environmental concerns in relation with the disposal of waste, there is a need for a more environmentally acceptable approach to the beneficiation of titaniferous ores. The roasting of ilmenite with soda, mainly in a reducing atmosphere with carbon has been disclosed (El-Tawil et al, Alkali reductive roasting of ilmenite ore, Canadian Metallurgical Quarterly, 1996, 35(1), 31-37). However, the yield of $TiO_2$ in this technique is not very high (<90 wt. %) and iron is neither separated in the metallic form nor is a leachable product produced. U.S. Pat. No. 6,346,223 teaches oxidative alkali roasting techniques. However, the yield of $TiO_2$ and the separation of actinides and lanthanides is below the required levels for the chloride process.

In sum, there is a need to develop processes for beneficiating titaniferous ores to produce beneficiated ores having high titania content and low impurity levels. The present invention provides such an improved process.

SUMMARY OF THE INVENTION

The invention is a process for beneficiating a titaniferous ore. The process comprises calcining the titaniferous ore, at least one alkali or alkaline earth metal salt, and at least one alumina-containing material in the presence of oxygen to form a calcined ore mixture. The calcined ore mixture is then leached with a solution comprising ammonium, sodium or magnesium chloride in the presence of oxygen, and preferably an oxygen-containing compound, to form a leached ore mixture, which is then contacted with an acid to form the beneficiated ore. The process of the invention results in high titania content while significantly reducing impurity levels in the beneficiated ore.

DETAILED DESCRIPTION OF THE INVENTION

The process of the invention is a method of beneficiating titaniferous ores. Titaniferous ores useful in the process of the invention include titania-containing ores that contain iron and other impurities. The titaniferous ore may be synthetic, but is preferably natural such as a powder, ore, mineral or mixture thereof. Preferred ores include ilmenite, anatase, ilmenite beach sands, low-grade titaniferous slag, natural rutile, or perovskite. Preferably, the titaniferous ore has $TiO_2$ concentrations between 40 and 75 weight percent $TiO_2$, but the process is useful for ores having higher titania content. The process of the invention is particularly useful for beneficiating titaniferous ores that contain additional impurities such as alumina, silica, phosphates, alkaline earth metals, and rare-earth and radio-active metals.

One such titaniferous ore is naturally occurring anatase $TiO_2$. Other types of ore include, but are not limited to slags, such as those containing high levels of calcium and magnesium, and are for example, located in Norway, Sweden, Canada, and China; tar sands, such as those that contain relatively high levels of alkaline earths and $SiO_2$ and are, for example, located in Alberta, Canada; and other types of naturally occurring titaniferous ores such as well known ilmenite deposits. Preferred titaniferous ores include anatase ore and ilmenite.

The process of the invention comprises first calcining a mixture of the titaniferous ore, at least one alkali or alkaline earth metal salt, and at least one alumina-containing material in the presence of oxygen to form a calcined ore mixture. The mixture of the titaniferous ore, at least one alkali or alkaline earth metal salt, and at least one alumina-containing material is typically mixed to form a homogeneous mixture for calcination. Methods for mixing solids to produce homogeneous mixtures are well known to persons skilled in the art.

The calcination is preferably carried out at a temperature in the range 200° C. to 1200° C., more preferably 300° C. to 1100° C., and most preferably 800° C. to 1000° C. The calcination may be performed in any conventional calcining apparatus, for example a conventional rotary kiln, a rotary hearth furnace, or an autoclave. The length of the calcination time is not particularly critical, so long as the desired temperature is reached and maintained for a minimum time that allows iron and non-ferrous minerals to be removed during the chemical leaching step. Preferably, the calcination time is greater than 0.5 hour and more preferably greater than 1 hour.

The alumina-containing material is any solid compound that contains an oxide of aluminum. Preferably, the alumina-containing material is alumina, aluminum hydroxide, alumina-containing clay, alkali metal aluminate (e.g., $NaAlO_2$), or mixtures thereof. The amount of alumina-containing material in the mixture is selected based on the ratio of titaniferous ore:alkali or alkaline earth salts, and the concentration of various impurities (mainly iron oxides, silicates and phosphates). The alumina-containing material is preferably present in the mixture in an amount in the range 5 to 30 wt. % of the titaniferous ore, more preferably 10 to 25 wt. %, and most preferably 15 to 22 wt. % of the titaniferous ore.

The alkali or alkaline earth metal salt is any salt that contains an alkali or alkaline earth metal. Preferably, the salt is an alkali or alkaline earth metal bicarbonate, carbonate, hydroxide, or sulfate. More preferably, the alkali salt is $NaHCO_3$, $KHCO_3$, $LiHCO_3$, $NaHSO_4$, $KHSO_4$, $Na_2CO_3$, $K_2CO_3$, $Li_2CO3$, LiOH, NaOH, or KOH. Most preferably, the alkali salt is sodium or potassium bicarbonate.

In one embodiment of the invention, the alkali or alkaline earth metal salt is a mixture of an alkali metal salt and a calcium oxide-containing material. The alkali metal salt is preferably $NaHCO_3$, $KHCO_3$, $LiHCO_3$, $NaHSO_4$, $KHSO_4$, $Na_2CO_3$, $K_2CO_3$, $Li_2CO3$, LiOH, NaOH, or KOH; and the calcium oxide-containing material is preferably calcium oxide, calcium hydroxide, or a mixture thereof.

The amount of alkali or alkaline earth metal salt will vary depending on the amount of $TiO_2$, $Fe_2O_3$, $Al_2O_3$, $SiO_2$ and $P_2O_5$ present in the ore. Depending upon the level of impurities, the amount of alkali or alkaline earth metal salt is typically from 100 to 300 weight percent of the ore weight. If a calcium oxide-containing material is used, preferably the amount of the calcium oxide-containing material is present in an amount in the range of 0.1 to 5 weight percent of the titaniferous ore, more preferably 2 to 3 weight percent of the titaniferous ore.

The calcination step is performed in the presence of oxygen. The oxygen may be pure oxygen but is preferably an oxygen-containing gas such as air, oxygen in nitrogen, or oxygen in other such gases or mixtures of gases.

Without wishing to be bound by theory, it is believed that the tendency for the thermal decomposition of alkali or alkaline earth salt creates nascent states of alkali/alkaline earth at the mineral-alkali interface which seems essential to achieve a higher percentage of $TiO_2$ yield. Further, steam generated by the decomposition of the alkali or alkaline earth salts is believed to decompose to form hydrogen and hydroxide ions ($H^+$+$OH^-$). The steam exerts pressure on the system and forces the hydroxyl group to penetrate into the titaniferous ore grains, thus weakening the bonds existing in the ore and increasing the exchange reaction between iron and alkali (alkaline earth) ions.

Thus, as the reaction event proceeds with a sodium salt, it is believed that the sodium comes closer into contact with the titaniferous ore at high temperature, distort, and begin to exchange or discard atoms. The closer contact of sodium with titaniferous ore is further exercised due to the release of high vapor pressure steam due to the salt decomposition (e.g., bicarbonates and hydroxides). As a result, the potential energy rises to a maximum and the atoms cluster and create an activated complex region. Then, the potential energy falls as the atoms rearrange in the cluster, to form products such as sodium ferrite and sodium titanate, respectively. The climax of the reaction takes place at the high potential energy region, where the high degree of closeness of the reactants and distortion, which is called the transition state.

During the reaction, it is further believed that the alumina-containing material reacts with the alkali (alkaline earth) salt and forms complex oxide phases (e.g., Na—Al—Si-M-O phases) which increase the solubility and stability of ferrites, such as sodium ferrites. This complex salt phase thereby helps to separate out iron oxides from the titanium oxide-containing composition.

Following calcination, the calcined ore mixture is preferably washed with water prior to the leaching step. Water washing produces a substantially insoluble residue. Water soluble alkali or alkaline earth compounds such as metal (e.g., sodium) ferrites, aluminate, silicate, chromate, vanadate and phosphate may be dissolved in the aqueous solution. If the calcined ore mixture is water washed, the insoluble ore residue is removed from the aqueous phase by any suitable means prior to the leaching step. Methods for separating the calcined ore from the aqueous phase are well known to persons skilled in the art and include, but are not limited, to filtration, settling, and the use of hydrocyclones.

After calcination, and optionally washing, the calcined ore mixture is leached with a solution comprising ammonium, sodium or magnesium chloride in the presence of oxygen to form a leached ore mixture and a first liquid phase. A leaching solution comprising ammonium chloride is especially preferred. The leach can occur at either ambient or elevated temperature. Preferably, the titaniferous ore is leached by contacting the ore at a temperature of at least 35° C. The leaching preferably occurs for a reaction time from 10 minutes to 24 hours, more preferably from 2 to 8 hours. The leaching is preferably performed while mixing the ore and solution mixture, using any suitable mixing means such as a mechanical stirrer.

The leaching occurs in the presence of oxygen. The oxygen may be pure oxygen but is preferably an oxygen-containing gas such as air, oxygen in nitrogen, or oxygen in other such gases or mixtures of gases. Preferably, the oxygen is in the form of air. Most preferably, the air is bubbled through the solution during the leaching step.

The leaching is performed with a solution comprising ammonium, sodium or magnesium chloride. Preferably, the solution comprises ammonium chloride. Preferably, the solution also contains 0.5 to 2 wt. % of an oxygen-containing compound. The oxygen-containing compound may be methanol, ethanol, acetone, glycol, glycerol, sucrose, glucose, fructose, glyoxal, acetaldehyde, formaldehyde, or mixtures thereof. Preferably, the oxygen-containing compound is methanol and/or acetone.

Preferably, the pH of the solution is in the range of from 3.5 to 4.5. The pH in the range of from 3.5-4.5 may be obtained, if required, by addition of a weak acid. Typically, only a minimum amount of the weak acid will be necessary to adjust the pH. The weak acid is preferably acetic acid, formic acid, or oxalic acid.

During the leaching step, the iron oxide from the calcined ore forms a complex with ammonium, sodium or magnesium ions and precipitates out as iron hydroxide. The leaching step produces a leached ore mixture and a first liquid phase. The first liquid phase contains ammonium chloride, metal ions and acetic acid solution which can be reused for the leaching process.

The leached ore mixture is preferably separated from the first liquid phase and washed well with water to remove the formed iron hydroxide. Methods for separating the leached ore mixture from the first liquid phase are well known to persons skilled in the art and include, but are not limited, to filtration, settling, and the use of hydrocyclones.

The leached ore is then contacted with an acid to form a beneficiated ore and a second liquid phase. The contacting can be performed at either ambient or elevated temperature. Preferably, the temperature is greater than 35° C., more preferably from 40 to 80° C. The contacting time preferably is from 10 minutes to 24 hours, more preferably from 2 to 6 hours. The contacting is preferably performed with mixing, using any suitable mixing means such as a mechanical stirrer.

The acid is preferably hydrochloric acid, sulfuric acid, nitric acid, acetic acid, formic acid, or mixtures thereof; more preferably the acid is hydrochloric acid.

The contacting step produces a beneficiated ore mixture and a second liquid phase. The second liquid phase contains iron chloride.

Preferably, the beneficiated ore is separated from the second liquid phase and then washed with water. Methods for separating the beneficiated ore from the second liquid phase are well known to persons skilled in the art and include, but are not limited, to filtration, settling, and the use of hydrocyclones. The beneficiated ore is preferably dried prior to shipping. It is preferred to calcine the beneficiated ore product in the presence of air and heat to remove bound water and to break down residual salts and acids, thereby generating a final synthetic rutile product. The final synthetic rutile can then be used as a feed to fluid bed chlorinators.

The process of the invention can be used to produce a high grade synthetic rutile having a $TiO_2$ content of >95 wt. % and a total iron of about 2 wt. % for ilmenite ore and >95 wt. % $TiO_2$ and <1 wt. % total iron for anatase ore. The particle size obtained after processing typically ranges from 75 to less than 425 microns, which is suitable for chlorination in a fluidized bed chlorination reactor.

The first and second liquid phases, and any other wash filtrates produced during the process, may be combined and contacted with carbon dioxide gas to recover dissolved aluminum and alkali or alkaline earth metal ions. For example, carbon dioxide passed through the liquid phases reacts with the sodium ions in the presence of water to form sodium bicarbonate, which can be recovered by any suitable process. The recovered sodium bicarbonate can be reused in the calcination step.

The following examples merely illustrate the invention. Those skilled in the art will recognize many variations that are within the spirit of the invention and scope of the claims.

EXAMPLE 1

Beneficiation of Ilmenite Ore from Australia

Ilmenite ore (analysis given in Table 1) is homogeneously mixed with twice the amount of sodium bicarbonate, and alumina (20 wt. % of the ore) to produce the charge for calcination. The charge is calcined in air at 950° C. for 120 minutes to produce a roasted mass. The roasted mass is washed well with water and the roasted grains are removed by filtration. The solubles are separated and stored for reclaiming the sodium ions. The roasted grains are then subjected to catalytic aeration in a ammonium chloride medium at pH 4 to remove iron as $Fe(OH)_3$. The catalytic aerated grain was separated from iron hydroxide by filtration.

The catalytic aerated grains are then acid washed with 4M HCl at 40-80° C. for 2 hours. After acid washing, the product is separated and washed well with water to remove sodium ions and rest of $Fe_2O_3$. The product obtained is high grade synthetic rutile having titania content >95 wt. %. The chemical analysis of the ilmenite ore and the beneficiated product 1 are listed in Table 1.

The soluble residues separated after the calcination and acid washing steps are bubbled with $CO_2$ gas in order to recover alkali salt and alumina.

EXAMPLE 2

Beneficiation of Anatase Ore

Anatase ore was subjected to steps identical to those described in Example 1. The chemical analysis of the anatase ore and the beneficiated product 2 are listed in Table 1.

TABLE 1

BENEFICIATION OF TITANIFEROUS ORES

| Components | Ilmenite Ore | 1 | Anatase Ore | 2 |
|---|---|---|---|---|
| $TiO_2$ (%) | 70.65 | 95.2 | 57.8 | 95.89 |
| $Fe_2O_3$ (%) | 21.69 | 2.01 | 14.61 | 0.8 |
| $Al_2O_3$ (%) | 2.51 | 1.2 | 7.64 | 0.84 |
| $SiO_2$ (%) | 2.13 | 0.9 | 1.65 | 0.74 |
| $P_2O_5$ (%) | 0.42 | 0.01 | 7.65 | 0.3 |
| CaO(%) | <0.01 | <0.01 | 2.13 | 1.17 |

We claim:

1. A process for beneficiating a titaniferous ore comprising:
   (a) calcining the titaniferous ore, at least one alkali or alkaline earth metal salt, and at least one alumina-containing material in the presence of oxygen to form a calcined ore mixture;
   (b) leaching the calcined ore mixture with a solution comprising ammonium, sodium or magnesium chloride in the presence of oxygen to form a leached ore and a first liquid phase; and
   (c) contacting the leached ore with an acid to form a beneficiated ore and a second liquid phase.

2. The process of claim 1 wherein the calcining is performed at a temperature from 800° C. to 1000° C.

3. The process of claim 1 wherein the titaniferous ore comprises an ore selected from the group consisting of ilmenite, anatase, ilmenite beach sands, low-grade titaniferous slag, natural rutile, perovskite, and mixtures thereof.

4. The process of claim 1 wherein the alkali or alkaline earth metal salt is selected from the group consisting of bicarbonates, carbonates, hydroxides, and sulfates.

5. The process of claim 1 wherein the alkali or alkaline earth metal salt is selected from the group consisting of $NaHCO_3$, $KHCO_3$, $LiHCO_3$, $NaHSO_4$, $KHSO_4$, $Na_2CO_3$, $K_2CO_3$, $Li_2CO3$, LiOH, NaOH, and KOH.

6. The process of claim 1 wherein the alkali or alkaline earth metal salt is sodium or potassium bicarbonate.

7. The process of claim 1 wherein the alumina-containing material is selected from the group consisting of alumina, aluminum hydroxide, alumina-containing clay, alkali metal aluminates, and mixtures thereof.

8. The process of claim 1 wherein the calcined ore mixture is washed with water prior to leaching step (b).

9. The process of claim 1 wherein the leaching is performed using a solution comprising ammonium chloride.

10. The process of claim 1 wherein the leaching of the calcined ore mixture occurs at a temperature of at least 35° C.

11. The process of claim 1 wherein the solution further comprises 0.5 to 2 wt. % of an oxygen-containing compound selected from the group consisting of methanol, ethanol, acetone, glycol, glycerol, sucrose, glucose, fructose, glyoxal, acetaldehyde, and formaldehyde.

12. The process of claim 11 wherein the oxygen-containing compound is selected from the group consisting of methanol and acetone.

13. The process of claim 1 wherein the solution has a pH in the range of from 3.5 to 4.5.

14. The process of claim 1 wherein air is bubbled through the solution during the leaching step.

15. The process of claim 1 wherein the acid is selected from the group consisting of hydrochloric acid, sulfuric acid, nitric acid, acetic acid, and formic acid.

16. The process of claim 1 wherein the acid is hydrochloric acid.

17. The process of claim 1 wherein the first and second liquid phases are contacted with carbon dioxide gas to recover dissolved aluminum and alkali or alkaline earth metal ions.

18. The process of claim 1 further comprising washing the beneficiated ore with water.

* * * * *